United States Patent [19]

Clebant

[11] 4,295,671
[45] Oct. 20, 1981

[54] FLEXIBLE UNION WITH PASSIVE COMPENSATION

[75] Inventor: Jean C. Clebant, Carbon-Blanc, France

[73] Assignee: Societe Europeenne de Propulsion, Puteaux, France

[21] Appl. No.: 69,738

[22] Filed: Aug. 27, 1979

[30] Foreign Application Priority Data

Sep. 19, 1978 [FR] France ............... 78 26846

[51] Int. Cl.³ ............................................. F16L 27/10
[52] U.S. Cl. .................................... 285/223; 285/263
[58] Field of Search ............... 285/223, 167, 231, 234, 285/261, 263, 266

[56] References Cited

U.S. PATENT DOCUMENTS

| | | | |
|---|---|---|---|
| 939,908 | 11/1909 | Greenlow | 285/263 |
| 3,643,728 | 2/1972 | Hufse | 164/132 |
| 3,680,895 | 8/1972 | Herbert et al. | 285/167 |
| 4,173,360 | 11/1979 | Bergman | 285/223 X |
| 4,183,556 | 1/1980 | Schwemmer | 285/223 X |

FOREIGN PATENT DOCUMENTS

| | | | |
|---|---|---|---|
| 928384 | 5/1955 | Fed. Rep. of Germany | 285/261 |
| 2273206 | 12/1975 | France . | |
| 2323089 | 4/1977 | France . | |

OTHER PUBLICATIONS

*Mechanical Engineering*, Dec. 1973, p. 67.

*Primary Examiner*—Dave W. Arola
*Attorney, Agent, or Firm*—Bill B. Berryhill

[57] ABSTRACT

A flexible union for connecting together two rigid tubular sections capable of oscillating with respect to each other, the union comprising elastic annular members each having its inner and outer faces connected to annular spherical surfaces bordering a gap separating from each other two rigid bodies each fast with or connected to a respective tubular section. Each elastic element is in one piece and adheres to the spherical annular surfaces between which it is located and the elastic elements delimit in said gap at least one closed annular chamber completely filled with a liquid which is little or not compressible.

5 Claims, 6 Drawing Figures

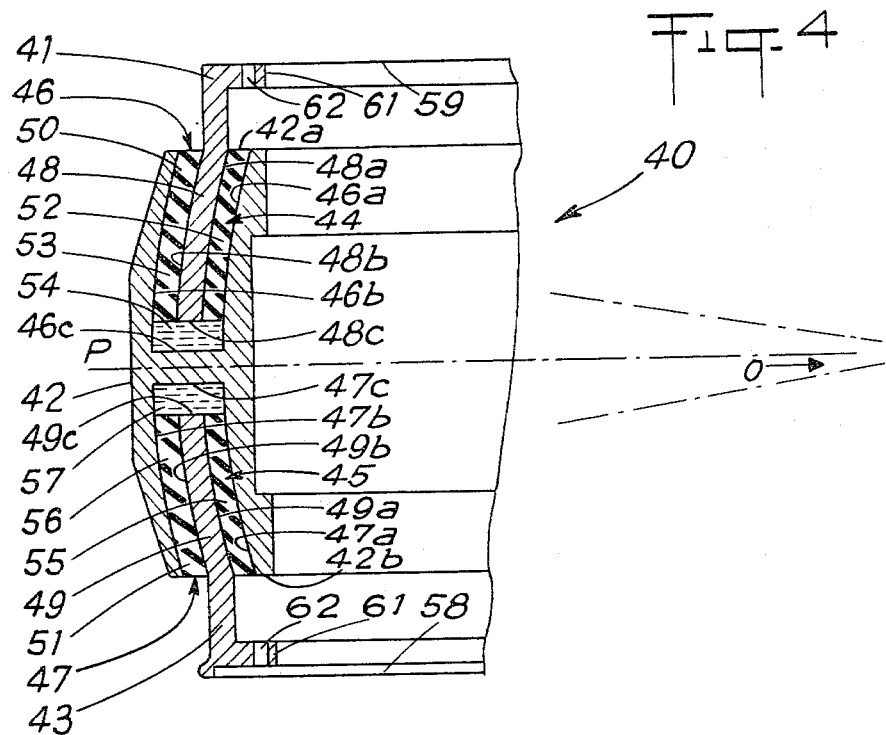
Fig. 4
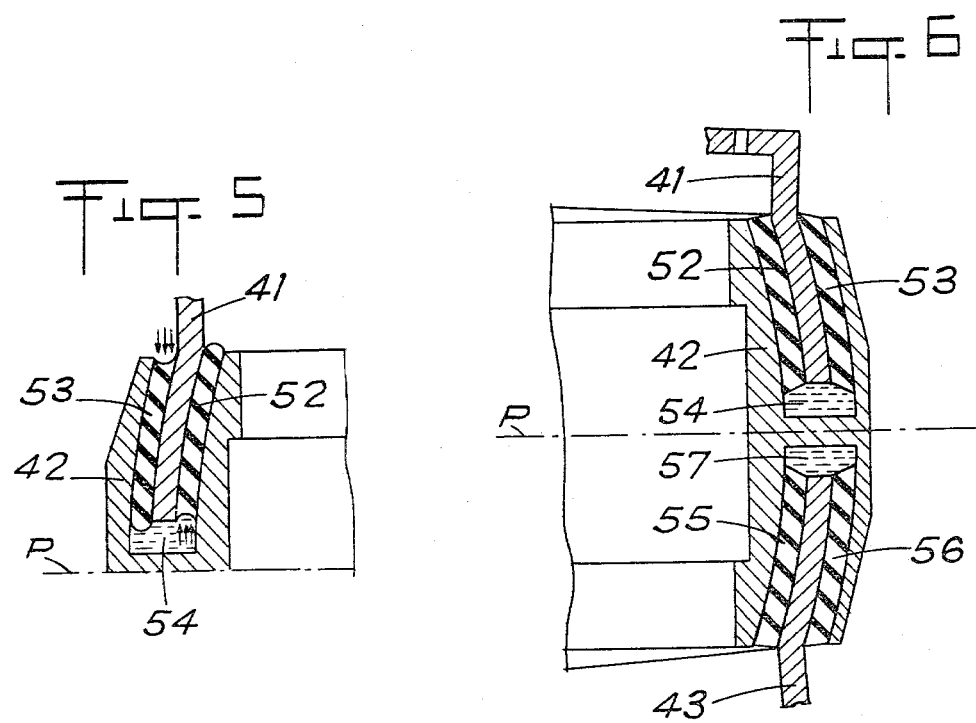
Fig. 5
Fig. 6

FLEXIBLE UNION WITH PASSIVE COMPENSATION

The present invention relates to a flexible union for connecting together two rigid tubular sections which may rotate with respect to each other about a central point, with a limited angular amplitude. More precisely, the invention relates to a flexible union of the type comprising a plurality of elastic spherical annular elements, the inner and outer faces of each element being connected to annular surface having the shape of parts of spherical surfaces and constituting parts of two surfaces bordering an annular gap entirely separating one from the other two rigid bodies, each fast with or forming part of a respective tubular section.

A particular, non-limiting domain of application of a flexible union according to the invention is the connection of two sections of a sealed pipe or passage connecting to the sea bed a surface drilling rig or platform for working an undersea well.

Within the scope of this particular application, such a union must be able to perform the following functions:
transmission of the longitudinal forces which are exerted on the connection;
to allow relative inclination of the bodies between which it is mounted (inclination of a few degrees), and
tightness at the level of the union between the inside of the pipe and the outside medium, particularly in the case of the existence of a high differential pressure.

To obtain these results, it has been proposed to make unions comprising flexible spherical elements each constituted by a stack of alternate spherical layers of an elastic material (rubber) and of a rigid, inextensible material (for example metal).

Now, it has appeared that such a composite element could not perform the different functions mentioned above alone and for a long time.

More complex solutions then had to be adopted.

In U.S. Pat. No. 3,680,895, a cylindrical supplementary element is provided for supporting the pulling forces and for avoiding a deterioration of the spherical composite elements of the union.

French Patent Application No. 2 323 089 suggests separating the flexible spherical elements serving for bearing from those serving for tightness, to avoid exposing the latter to forces which may damage them.

These solutions prove, however, to be expensive, due particularly to the cost and difficulty of producing elements constituted by alternate spherical layers of metal (or other rigid material) and of rubber adhering perfectly to one another.

It is therefore an object of the present invention to provide a flexible union performing the different functions which it has to perform whilst being much less expensive to manufacture than the known unions mentioned hereinabove.

This object is attained by a union in which, according to the invention, each elastic element is formed by a single pieces and adheres to the spherical annular surfaces between which it is located, and the elastic elements delimiting, in the annular gap between the rigid bodies, at least one closed annular chamber filled completely with a liquid which is little or not compressible.

One rigid piece thus possesses, with respect to the other, three degrees of freedom in rotation about the central union. No supply of hydraulic fluid from an outside source (active compensation) is necessary during movements. The union according to the invention is therefore a flexible union with passive compensation.

It is the liquid contained in the chambers which ensures the transmission of the axial efforts between the rigid bodies, thus avoiding subjecting the elastic elements to detrimental deformations. These elements are then each made in one piece, from rubber or elastomer. The cost of such elements is clearly lower than that of elements formed by stacking alternate layers of rubber and inextensible reinforcement.

According to an embodiment of the union according to the invention, the annular gap presents, in transverse section, substantially the shape of at least an S, the parts of the gap forming the end arms of the S each being occupied by an elastic element and the central part forming a chamber filled with liquid.

The union advantageously comprises at least three elastic spherical, annular elements, two end ones and one intermediate, which are each formed in one piece from elastic material, are located in said annular gap and define therein two closed annular chambers filled with liquid. The intermediate elastic element is fixed, on the inside, on a spherical surface of which the radius of curvature is greater than that of at least one of the spherical surfaces on which the elastic end elements are fixed on the inside.

One of the chambers may present, in transverse section, an elongated form substantially perpendicular to the axis of the annular elastic elements.

According to another embodiment of the union according to the invention, the annular gap presents, in transverse section, substantially the form of a U, the parts of said gap forming the arms of the U each being occupied by an elastic element and the central part forming a chamber filled with liquid.

It is also an object of the invention to provide a method for manufacturing a flexible union comprising at least one elastic element in one piece located in a gap between two rigid pieces adhering to the walls opposite these two pieces and delimiting, at least partially, with said pieces, a closed chamber completely filled with a liquid.

This purpose is attained by a method according to which a solid core made of a material soluble in a solvent, is disposed at the location provided for said closed chamber, a product furnishing an elastic material by polymerisation or vulcanisation of said material is positioned between said rigid pieces and at the location provided for the elastic element, and the core is dissolved by introducing said solvent through at least one passage made in one of the rigid pieces.

The invention will be more readily understood on reading the following description with reference to the accompanying drawings, in which:

FIG. 4 is a schematic half-view in median longitudinal section of a second embodiment of a flexible union according to the invention;

and FIGS. 5 and 6 are two very schematic views illustrating the deformations of the elastic elements of the union of FIG. 4.

Figure 1:
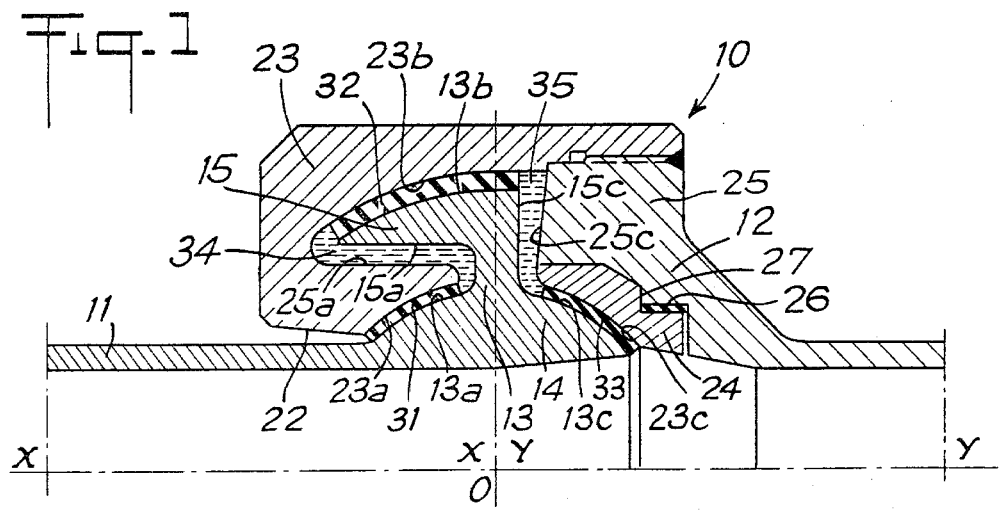
FIG. 1 is a schematic half-view in median longitudinal section of a first embodiment of a flexible union according to the invention.

Referring now to the drawings, the tubular union 10 shown in FIG. 1 connects the ends of two rigid tubes 11-12 located in line with each other. The tubes 11 and 12 normally have merged axes x-x and y-y. However, the union 10 is designed so as to allow a relative rotation between the tubes 11-12, of limited angular amplitude about a central point 0 located on the axes x-x and y-y. In the case, for example, for the tubes 11, 12, of sections of a pipe connecting a platform to a fixed reference connected to axis x-x, the axis y-y must be able to occupy any position contained in a cone of axis x-x, of vertex 0 and of semi-vertex angle equal to a few degrees, for example 10° at maximum.

The tube 11 is provided, at its end connected to tube 12, with an annular swell 13, having outer surfaces 13a, 13b, 13c of axis x-x and centred on 0.

The surfaces 13a, 13b, 13c are annular surfaces of revolution formed by portions of spherical surfaces. These surfaces, and other similar surfaces, will be designated, for simplification, by the expression "annular spherical surfaces".

The annular spherical surfaces 13a and 13c are outer surfaces of a ball joint 14 on either side of the median transverse plane of this ball joint.

The annular spherical surface 13b has a radius of curvature greater than that of the surfaces 13a and 13c. This surface 13b is the peripheral surface of an annular projecting piece 15 surrounding the ball joint 14 and fast therewith. In the example shown, the surface 13b is connected to the surfaces 13a and 13c by a continuous cylindrical surface 15a of axis x-x and by a substantially radial continuous surface 15c.

The swell 13 is completely surrounded by pieces forming part of the tube 12 or fast therewith in rotation about the central point 0.

Thus, a case 23 screwed, then welded, on a shoulder 25 formed at the end of the tube 12 presents annular spherical inner surface 23a, 23b of axis y-y and of centre 0 which surround the surfaces 13a, 13b whilst being spaced therefrom. The surfaces 23a, 23b are connected by a cylindrical surface 25a of axis y-y which faces the surface 15a whilst being spaced therefrom.

An annular spherical surface 23c surrounds the surface 13c and is spaced therefrom. The substantially radial front surface 25c of the shoulder 25 connects the surfaces 23c and 23a.

A continuous gap 30 is therefore formed around the whole of the swell 13. In this gap are disposed three spherical rings 31, 32, 33 made of elastic material, for example made of natural or synthetic rubber. The end ring 31 connects the walls 13a and 23a together, whilst the other end ring 33 connects walls 13c and 23c. The intermediate ring 32 connects surfaces 13b and 23b.

In the gap 30, the rings 31, 32, 33 define, by their edges, two closed annular chambers 34, 35 which are completely filled with a liquid which is little or not compressible. The chamber 34 is defined by the adjacent edges of the rings 31, 32 and by the walls 15a, 25a. This chamber 34 therefore presents, in transverse section, an elongated shape extending substantially parallel to the axes x-x and y-y.

The chamber 35 is limited by the adjacent edges of the rings 32, 33 and by the walls 15b, 25b. This chamber 35 therefore presents, in transverse section, an elongated form extending substantially radially with respect to axes x-x and y-y.

The functioning of the union 10 described hereinabove is as follows:

The tubes 11 and 12 possess, with respect to the other, three degress of freedom in rotation about the central point 0.

The two degress of freedom of the ball joint of centre 0 are limited by direct abutment of the tube 11 on the conical inner flange 22 of the case 23.

The chambers 34, 35 ensure the transmission of the longitudinal forces between the tubes 11 and 12 without the rings 31, 32, 33 undergoing deformations in pull or in compression which may deteriorate them. This is why these rings are each simply formed in one piece and of elastic material.

The longitudinal compressive stresses are transmitted by pressurising the chamber 35 whilst the longitudinal pulling forces are transmitted by pressurising chamber 34.

The radial forces are transmitted by compression of the elastic rings 31, 32, 33. In the case of a union used for connecting two sections of a pipe connecting a surface platform to the sea-bed, these radial forces are relatively weak.

It will be noted that the flexible joint part, housed in a part of the gap 30 with transverse section in S-form, and comprising the elastic elements 31 and 32 defining the chamber 34 (or the elements 32 and 33 delimiting the chamber 35), obtains the results described hereinabove with the exception of the transmission of the longitudinal pulling forces. A flexible union could therefore be sufficient, comprising two annular elastic elements separated by an annular chamber filled with liquid when the longitudinal forces to be transmitted are only compressive.

As indicated hereinabove, the axial deformations of the elastic rings are limited due to the presence of chambers 34, 35. However, a relative axial displacement of limited amplitude of the tubes 11, 12 is not excluded. It is desirable to avoid the pulling deformation, which may result from such a relative axial displacement, being taken solely by the elastic rings. In particular, it is preferably sought that the effect of the internal pressure prevailing in the conduit maintains the elastic rings in compression whatever this internal pressure and whatever the pulling force exerted between the tubes 11 and 12. To this end, to protect one of these rings, for example ring 33, it is connected to the spherical surface 23c of a piece 24 which is fast with the tube 12 in rotation about the point 0 but which can move axially with respect to the tube 12. The piece 24 is a ring inserted at the end of the tube and connected thereto by an elastic cylindrical ring 26 adhering to cylindrical walls opposite the tube 12 and the piece 34.

A relative axial pulling displacement between the tubes 11 and 12 is therefore taken by shear of the ring 26 made for example of natural or synthetic rubber.

For the transmission of the compressive stresses, the ring 24 comes into abutment against a radial wall 27 of the tube 12.

Figure 2:
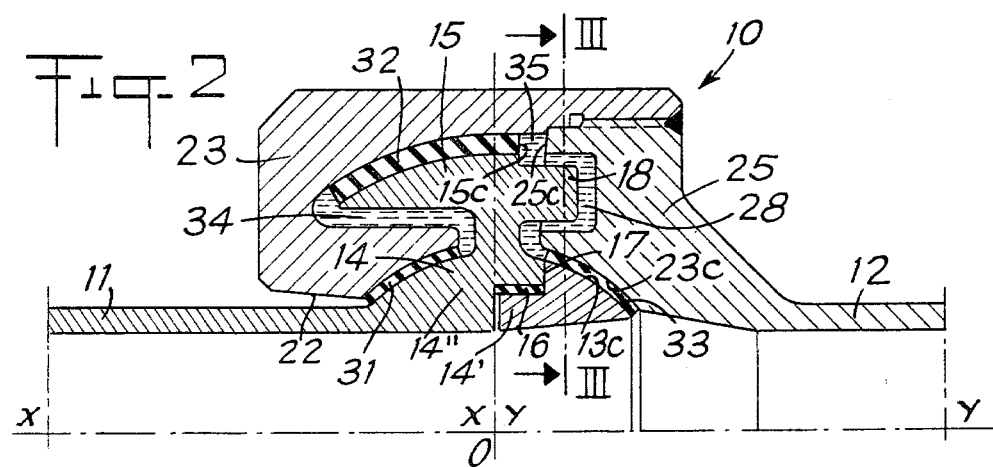
FIG. 2 is a schematic half-view in median longitudinal section of a variant embodiment of the union of FIG. 1.

By way of variant (FIG. 2), the surface 23c is formed on the tube 12 or a piece fast therewith, whilst the surface 13c is formed on an annular piece 14' of axis x-x. The piece 14' is fast with the tube 11 in rotation about the point 0 but may move axially with respect to the tube 11. In the example illustrated, the piece 14' constitutes the ball joint 14, with a piece 14" which is fast with the tube 11, which carries the annular projection 15. The connection between the pieces 14' and 14" is effected by a cylindrical elastic ring 16, for example made of rubber, adhering to cylindrical walls opposite the pieces 14' and 14".

A relative axial pulling displacement between the tubes 11 and 12 is taken by shear of ring 16. For the transmission of the compressive stresses, the piece 14' comes into abutment against a radial wall 17 of the piece 14".

Figure 3:
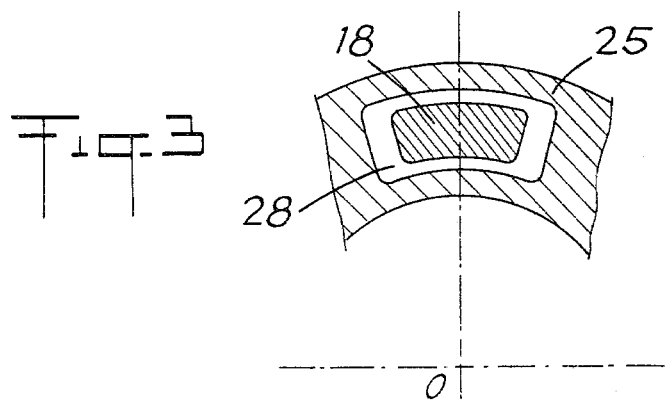
FIG. 3 is a partial schematic view in section along line III-III of FIG. 2.

By way of variant (FIGS. 2 and 3), means are provided for limiting the relative rotation of the tubes 11 and 12 about their axis in case of application of considerable torques. Coupling elements with relatively large clearance between the tubes are therefore provided to render the tubes fast in rotation about their axis when the rotation of one of the tubes with respect to the other exceeds a predetermined value.

In the example illustrated (FIGS. 2 and 3), the coupling elements are bosses 18 carried by the tube 11, for example bosses projecting in axial direction on the radial surface 15c.

The bosses 18 penetrate with clearance in grooves 28 in the form of sectors made in the front radial surface 26c of the tube 12.

The maximum angular movement of the bosses 18 in the grooves 28 is chosen to remain compatible with the maximum deformations admissible in the elastic material of the rings 31 to 33.

Therefore it is only when the moment of torsion between the tubes 11 and 12 exceeds a certain limit that there is direct contact between them.

FIG. 4 illustrates another embodiment of a flexible union according to the invention intended in particular for the construction of an articulated tight conduit, for example for constituting a dry passage connecting a surface platform to the head of an underwater well.

The flexible ring 40 shown in FIG. 4 may constitute an elementary link of the tight conduit or passage which is then formed by rigidly assembling a plurality of rings end to end. This flexible ring 40 may also constitute an articulation of the tight conduit or passage, and it is then inserted between two rigid tubular sections.

The flexible ring 40 comprises three rigid tubular bodies 41, 42, 43. The bodies 41 and 43 form the axial ends of the ring 40 and are connected to the intermediate body 42 by flexible union 44, 45 according to the invention. The plane of symmetry of the ring 40 is the median radial plane P of the body 42.

The union 44, 45 are housed in annular U-grooves 46, 47 closed in the end opposite radial faces 42a, 42b of the body 42. Each groove is delimited by two annular spherical walls 46a, 46b, 47a, 47b, respectively, connected by a radial flat base wall 46c or 47c, respectively.

Spherical rings 48, 49 fast with the bodies 41, 43 penetrate, with clearance, inside the grooves 46, 47.

The rings 48, 49 have inner faces 48a, 49a and outer faces 48b, 49b in the form of annular spherical surfaces respectively of the same centres of curvature as the surfaces 46a, 47a and 46b and facing said latter. The end faces 48c, 49c of the rings 48, 49 are flat radial faces facing the bottoms 46c, 47c of the grooves 46, 47.

Between the rings 48, 49 and the walls of the grooves 46, 47, respectively are arranged gaps 50, 51 of U-shaped transverse section.

The gap 50 is occupied, at its end parts corresponding to the arms of the U, by elastic spherical annular elements 52, 53, each in one piece which delimit, with the walls 46c, 48c a closed intermediate annular chamber 54 completely filled with a liquid which is little or not compressible. The elements 52, 53 adhere to the walls between which they are respectively disposed, 46a, 48a and 46b, 48b.

Similarly, the gap 51 is occupied by elastic spherical annular elements 55, 56 which are each formed in one piece which adhere to the walls between which they are disposed, and which delimit with the walls 47c, 49c a closed annular chamber 57 completely filled with liquid which is little or not compressible.

The functioning of the flexible ring is as follows:

The tightness between the inside of the ring and the outside is ensured by the adherence between the elastic elements and the rigid bodies.

The holding at a differential pressure between the inside and outside of the ring is obtained by the resistance of the elastic elements to the lateral forces (FIG. 5).

The passive compensation of the compressive stresses exerted on the ring, particularly when a plurality of rings are stacked vertically, is brought by the liquid of chambers 54, 57.

The flexibility of the ring 40 is obtained by relative rotation of the pieces 41, 42, on the one hand and 42, 43 on the other hand, with deformation of the elastic elements (FIG. 5).

It will be noted that the centres of curvature of the unions formed in grooves 46 and 47 may be distinct or merged at a point 0 of plan P, the ring 40 constituting an articulation about two points or about point 0 of plan P.

When the rings 40 constitute the elementary links of a tight conduit, passage or tunnel, a housing 58 is provided at the end of one of the rigid bodies 43, in which housing the end 59 of the other rigid body of an adjacent ring is fitted. Annular flanges 60, 61 are formed at the level of housing 58 and of end 59. These flanges are preferably inner flanges for allowing access from inside the ring to fixing element passing through orifices 62 in these flanges and rigidly connecting the consecutive rings 40, with the interposition of a seal.

A tight, dry conduit or tunnel may thus be constructed for the passage of various equipment and even of personnel between a surface platform and the head of an immersed well.

The flexible unions according to the invention comprise elastic annular elements made in one piece, adhering to rigid body walls and delimiting closed chambers filled with liquid.

To obtain a satisfactory connection between the elastic elements, generally made of natural or synthetic rubber, and the rigid metal bodies, generally made of steel, this connection is effected by baking in situ (polymerisation or vulcanisation) of the material constituting the elastic elements.

To this end, the raw material, giving this elastic material after baking, is cast in the locations provided for the elastic rings.

The location of chambers 34, 35, 54, 57 is reserved by solid cores soluble in a solvent and able to resist the conditions necessary for the operation of polymerisation or vulcanisation of the elastic material. This operation carried out, the solid cores are dissolved by injection of solvent through the channels (not shown) provided for example through the wall of the case 23 or the body 42. After dissolution of the cores, the chambers filled with liquid are definitively closed by obturation of the channels.

By way of indication, the soluble cores may be constituted by a polymer containing aluminium or silica powder for example, which, after baking, presents a good mechanical strength, rendering it suitable for casting and machining. This product may easily be disintegrated by a jet under pressure of solvent non-destructive for the material of the elastic elements, for example water or alcohol.

I claim:

1. A flexible union for connecting together first and second rigid tubular sections capable of oscillating with respect to each other about a central point with a limited angular amplitude, said union comprising:

a first rigid body fast with or forming part of said first tubular section, said first body having an annular projecting portion at one end of said first tubular section, and said projecting portion having a front external surface directed toward said second tubular section and a back external surface directed toward said first tubular section;

a second rigid body fast with or forming part of said second tubular section, said second body having an annular recess completely surrounding said projecting portion and defining therewith an annular gap, said first and second bodies being entirely separated from each other by said annular gap bordered by first and second surfaces belonging respectively to said first and second bodies;

at least a first and a second separate elastic annular elements located in said gap, each element being formed in one piece and having inner and outer faces bound to annular surfaces having the shape of spherical surface parts belonging respectively to said first and second surfaces; and at least one closed annular chamber formed in said gap between said first and second elastic elements and having opposite walls belonging respectively to said first and second bodies, said chamber being completely filled with a substantially non-compressible liquid and being adjacent to at least a portion of the rearward surface of said projecting portion so as to allow the transmission of axial traction forces between said first and second tubular sections through said liquid.

2. A flexible union as claimed in claim 1, wherein said annular gap presents, in transverse meridian section, substantially the form of at least an S with the parts of said gap forming the end arms of the S each being occupied by an elastic element and the part of said gap forming the central portion of the S forming a chamber filled with liquid.

3. A flexible union as claimed in claim 1, further comprising a third elastic annular element located in said annular gap and having inner and outer faces bound to spherical surface parts belonging respectively to said first and second surfaces, said first, second and third elastic elements defining therebetween in said gap first and second chambers filled with liquid, and said second chamber being adjacent to at least a portion of the front surface of said projecting portion to allow the transmission of axial compression forces between said first and second tubular sections through the liquid in said second chamber.

4. A flexible union as claimed in claim 1, and comprising one elastic annular element which adheres by one of its faces, on a piece fast with one of said rigid bodies in rotation about the central point and axially connected to said one body by an elastic ring housed in a cylindrical gap between said piece and said one body.

5. A flexible union as claimed in claim 1, further comprising at least one connecting piece coupling the rigid bodies in rotation about the axis of said elastic elements when the angle of rotation of one of the rigid bodies with respect to the other, about said axis, exceeds a given value.

* * * * *